US012792429B1

(12) United States Patent
Harris et al.

(10) Patent No.: US 12,792,429 B1
(45) Date of Patent: Nov. 10, 2026

(54) INTELLIGENT DISTURBANCE LIMITS ON COMMUNICATING DEVICES

(71) Applicants: Scott C Harris, San Diego, CA (US); Benjamin J Kwitek, Colorado Springs, CO (US)

(72) Inventors: Scott C Harris, San Diego, CA (US); Benjamin J Kwitek, Colorado Springs, CO (US)

( * ) Notice: Subject to any disclaimer, the term of this patent is extended or adjusted under 35 U.S.C. 154(b) by 0 days.

(21) Appl. No.: 19/300,093

(22) Filed: Aug. 14, 2025

(51) Int. Cl.
*G06F 9/54* (2006.01)

(52) U.S. Cl.
CPC .................................... *G06F 9/542* (2013.01)

(58) Field of Classification Search
None
See application file for complete search history.

(56) References Cited

U.S. PATENT DOCUMENTS 11,283,751 B1 * 3/2022 Jaiswal ................... H04L 51/18
2004/0259536 A1 * 12/2004 Keskar .................. H04M 19/04 455/418
2010/0082751 A1 * 4/2010 Meijer .................... G06F 15/16 709/206
2010/0107179 A1 * 4/2010 Quintanilla ............. G06F 9/542 719/318
2012/0258691 A1 * 10/2012 Baer ................. H04M 1/72448 455/412.2
2013/0316744 A1 * 11/2013 Newham ........... H04M 1/72454 455/458
2017/0063750 A1 * 3/2017 Vardhan ............ H04M 1/72448
2018/0176885 A1 * 6/2018 VanBlon ................. H04W 4/02
2018/0290622 A1 * 10/2018 Mori ...................... G08B 21/00
2019/0007546 A1 * 1/2019 Anderson ......... H04M 1/72454
2019/0058677 A1 * 2/2019 Maekawa ............. H04L 51/212
2019/0289367 A1 * 9/2019 Siddiq .................. H04N 21/485
2020/0041803 A1 * 2/2020 Reyes ..................... G06V 40/10
2020/0259948 A1 * 8/2020 Keohane ................. G06F 1/163
2020/0396328 A1 * 12/2020 Salminen .......... H04M 1/72454
2021/0092219 A1 * 3/2021 Hwang ............. H04M 1/72463

(Continued)

OTHER PUBLICATIONS

Li et al.; "Alert Now or Never: Understanding and Predicting Notification Preferences of Smartphone Users"; ACM Transactions on Computer-Human Interaction, vol. 29, No. 5, Article 39. Published: Nov. 2022; https://doi.org/10.1145/3478868; (Li_2022.pdf) (Year: 2022).*

(Continued)

*Primary Examiner* — Hiren P Patel
(74) *Attorney, Agent, or Firm* — Scott C Harris, Esq.

(57) ABSTRACT

An interruption management system for a communicating device. The communicating device determines the activities of the user, both future activities and current activities. The system has rules for determining based on certain activities, whether the communicating device should interrupt the user. When the user is doing these activities, the rules are used to set responses that determine what kind of interruptions are allowed. When interruption is carried out, the system learns from reactions to the interruption whether the interruption should be handled the same way in the future or should be modified. This can provide targeted notifications of certain kinds during certain activities, and not provide other notifications during that activity depending on the user's preferences.

10 Claims, 2 Drawing Sheets

(56) References Cited

U.S. PATENT DOCUMENTS

| | | | | |
|---|---|---|---|---|
| 2021/0096933 | A1* | 4/2021 | Tao | G06F 9/546 |
| 2022/0368665 | A1* | 11/2022 | Walters | H04L 51/224 |
| 2022/0375315 | A1* | 11/2022 | Faaborg | G08B 1/08 |
| 2024/0259524 | A1* | 8/2024 | Li | G06V 40/20 |
| 2025/0379934 | A1* | 12/2025 | Rose | H04M 1/72454 |

OTHER PUBLICATIONS

Okoshi et al.; "Real-world large-scale study on adaptive notification scheduling on smartphones"; 2018 Elsevier B.V.; https://doi.org/10.1016/j.pmcj.2018.07.005; (Okoshi_2018.pdf) (Year: 2018).*

Heinisch et al.; "Investigating the Effects of Mood & Usage Behaviour on Notification Response Time"; arXiv:2207.03405v1 [cs.HC] Jul. 7, 2022; https://doi.org/10.1145/3411813; (Heinisch_2022.pdf) (Year: 2022).*

Jarupreechachan et al.; "Do Not Disturb: An Implication design to be alerted but less stress"; IEEE 2023 (Isemantic); (Jarupreechachan_2023.pdf) (Year: 2023).*

Kanjo et al.; "NotiMind: Utilizing Responses to Smart Phone Notifications as Affective Sensors"; 2017 IEEE; Digital Object Identifier 10.1109/ACCESS.2017.2755661; (Kanjo_2017.pdf) (Year: 2017).*

* cited by examiner

INTELLIGENT DISTURBANCE LIMITS ON COMMUNICATING DEVICES

BACKGROUND

Modern communicating devices such as smartphones are ubiquitous in contemporary life. These devices are driven by software-whether the operating system software or their applications ("apps"). An inherent part of using these communicating devices is that the devices often notify the user of various things that have happened, desired or otherwise. The operating system software in the applications also is frequently updated. Both the updates and the notifications can interrupt what a user is doing.

A problem noticed by the inventors is that smartphones are not currently smart when it comes to the timing of these updates and notifications. System software can update at inconvenient times: e.g. the night before an early morning flight. Apps often ask questions when one is late for work. A user's music app might ask if they want to enter a contest for free concert tickets while the user is in the dentist's chair for a cleaning. The apps also provide notifications, some of which may be relevant and some not so much.

Many communicating devices have a blanket do not disturb mode. The do not disturb feature turns off everything, all sounds, sometimes lights, and basically interrupts the user's interaction with the outside world. This may be the right answer in a meeting, concert, play or other scenario where the user's complete attention is needed.

Do not disturb features often have an override for certain contacts. For example, you can set your child or babysitter as an emergency contact which will override the do not disturb feature.

Therefore, the inventors have recognized a real need for an improved and intelligent system for managing interruptions on communicating devices, such as smartphones.

SUMMARY OF THE INVENTION

The interruptions that we receive from our communicating devices are literally disturbances to a user's normal workflow.

Interruptions as described in the present application include any message or request received from a running software program. Typical interruptions include requests to update a program, or "updates," and notifications to a user about things that the application might deem relevant. Typical interruptions can include software updates, password updates, offer notifications, news events order status events, message notifications and other items that require immediate time and attention from the user.

Existing do not disturb modes can silence all notifications from the apps, however, do nothing to stop an ongoing update.

Existing do not disturb modes have no way of learning or tailoring to what a user may or may not want to disturb them.

The present invention provides a method and system to provide interruption limits. It is anticipated that these limits would be user-informed since every user has a unique lifestyle in addition to different patience thresholds.

Communicating devices, such as smartphones, as described herein, can mean any personal electronic device including phones, tablets, laptops, watches, glasses and others. Apps can mean any software installed on the device-whether operating (like iOS or Android) or applications (apps) such as DoorDash, Outlook, or Uber.

BRIEF DESCRIPTION OF THE DRAWINGS

In the Drawings.

the figures show aspects of the invention, and specifically.

DETAILED DESCRIPTION

Figure 1:
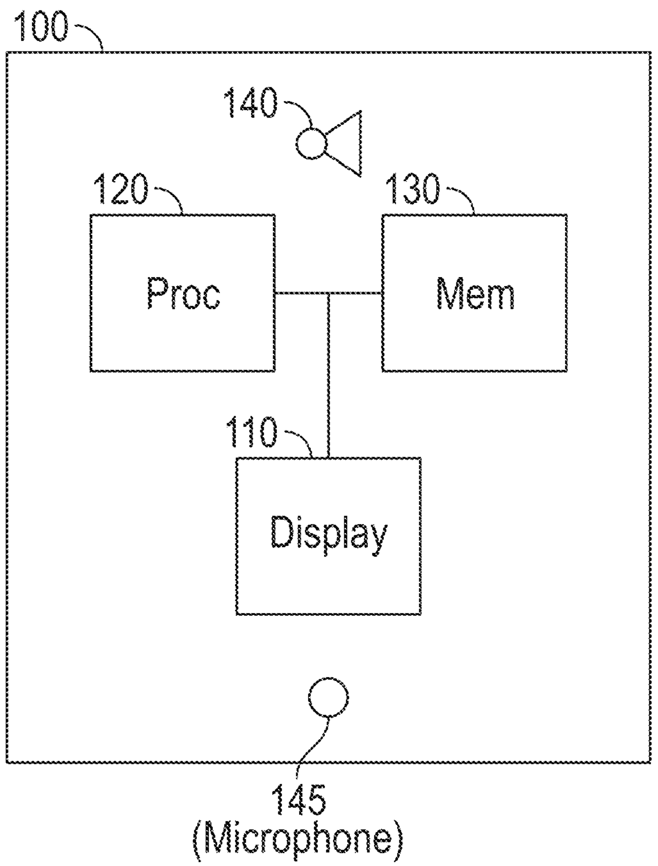
FIG. 1 shows a block diagram of a system.

The inventors recognize that a do not disturb function is sometimes more than is warranted by a situation. While perfectly quiet is sometimes nice, it is more than is really needed or desired in many scenarios-including perhaps at dinner, and other places where the user wants to be "in the loop" without feeling burdened or bugged by ill-timed disturbances from their device and its software. In many scenarios, the user may be perfectly happy to be interrupted by certain interesting things, but less happy to be interrupted by software updates or things like order statuses.

The present application describes a system that addresses the situation providing intelligent management of interruptions.

In an embodiment, the user has a communicating device 100 which can be a smartphone or any other method of communicating. The device has a number of different signaling systems allowing providing notifications to a user. Screen 110 can provide pop up notifications, and a speaker 115 which can provide sound notifications. There can also be other types of systems. A processor 120 in the communicating device runs a program that controls the operations of the communicating device 100. The communicating device includes a camera 140 which images a current location and a microphone 145 which receives audio input. As conventional, the communicating device stores a number of different kinds of information, including contacts and a calendar in its memory 130. The communicating device also sends and receives emails and texts, and the processor can review the emails and texts to look for information about the user's future plans.

Figure 2:
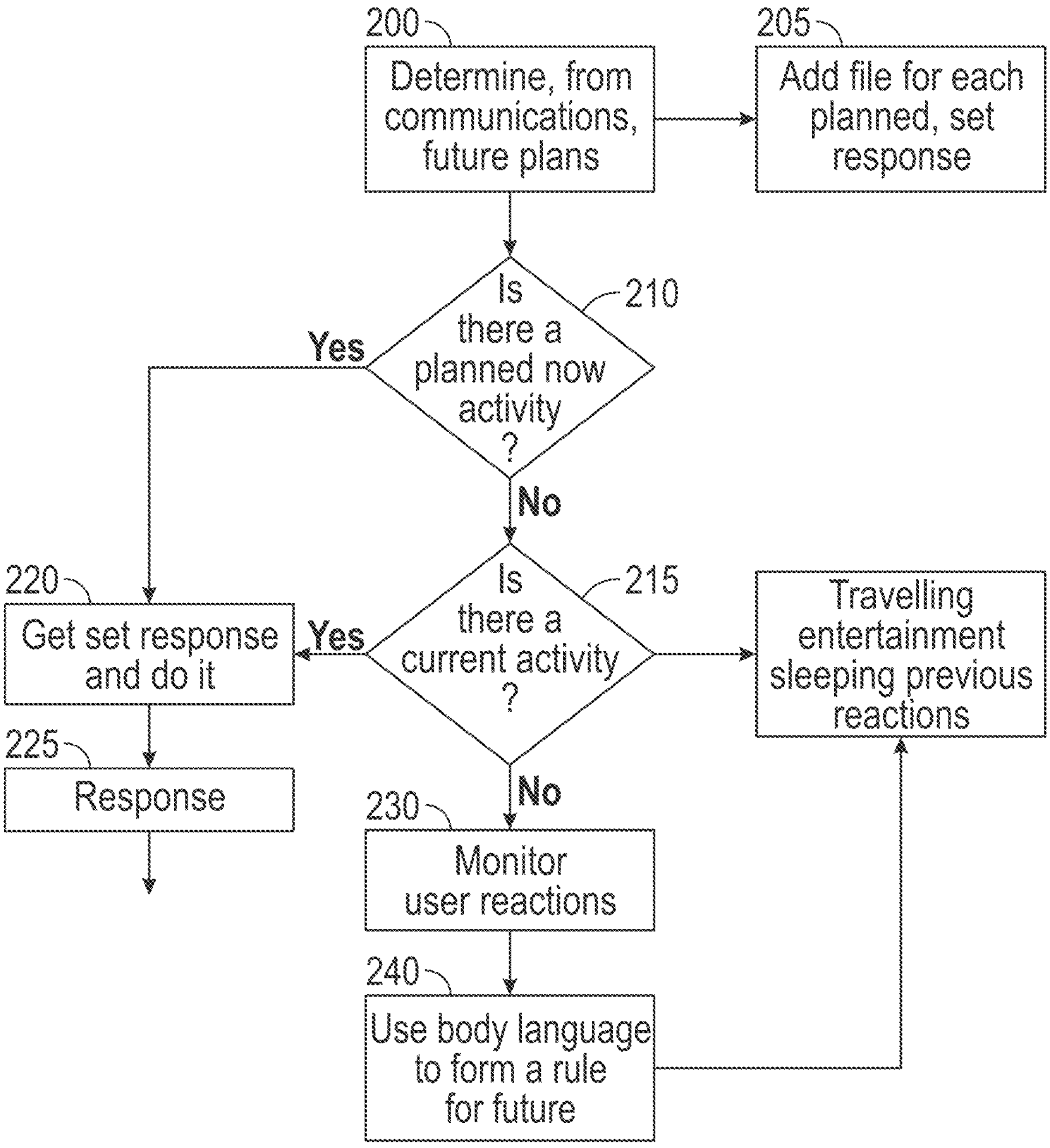
FIG. 2 shows a flowchart of operation of the interruption management system according to the present application.

The flowchart of operation of the system is shown in FIG. 2. In an embodiment, the processor reviews the activity and entries on the device at 200 using an intelligent scanner, such as an Artificial Intelligence (AI) model, to determine future user times of activities of the users. The intelligent scanner operates to scan the user's email Inboxes and viewing calendar appointments. From this analysis, the scanner determines unwelcome disturbance periods, specifically times when the user is scheduled to have an activity where certain interruptions to the phone's operation would be unwelcome.

This is used to create an anti-disturbance or AD file at 205, that is a file of preferences. The preferences indicate, for each of a number of activities of the user, a response that manages the interruptions that the communicating device will cause to the user. The activities can be any of the activities described herein, or anything else that the user is doing or could do. The interruptions can be anything that the communicating device does that could interrupt the user, including updates and notifications.

The preferences are used to determine a response for each specific activity that manages what interruptions can be allowed during that activity.

The response to the interruptions can be preset default responses, can be updated manually by the user, and also can be learned responses that are learned by watching the user's reactions to the different kinds of interruptions.

As described above, interruptions can include system interruptions such as updates to the system, request for password updates, and other interruptions that are caused by the software. The interruptions can also include notifications created by the software.

The system determines from the future plans that have been analyzed, at 210, if there is a planned activity now.

At 215, if there is not a planned activity now, and the system looks for a current activity. As described herein, this is determined based on a number of analyses including current surroundings of the user. The current activity can be for example and as explained herein, traveling, entertainment, sleeping, or items to which there were previous reactions of the user.

If there is either a planned activity or a current activity, the system gets the set response of the user at 220, from the stored responses, and carries out the response at 225.

At 230, the system monitors user reactions. Body language of the user, as received by sensors on the phone such as the camera on the phone, is monitored to form a rule for the future.

All of this is carried out as described herein.

The responses can be as follows:

When a user has a flight planned, the system can prevent system updates from occurring to any app that might be involved in the flight.

The system can prevent system updates to apps that could be used for the transportation to or from the flight.

The system can prevent system updates to apps that could be used for a planned hotel stay, and also prevents global system updates.

The system carries out this prevention for a safe period before the flight and after the flight, e.g., for 6 hours before, and 4 hours after.

While the user is staying in a hotel, the system prevents updates to the specific hotel app, and also prevents global system updates (in case the user needs their phone for something in the hotel).

While the user is in the air or in or on any transport mode (mass transit, taxi, uber), the system prevents all updates.

As one example, if the scanning determines that the user has a 7:00 AM flight on Monday morning, the A.D. file will indicate a 7:00 AM flight. The response, however, would decide what is to be done in response to this 7:00 AM flight.

In an embodiment, this response is to disallow relevant updates beginning on Sunday evening through at least the time when the flight actually takes off where the relevant updates are those related to anything having to do with the travel. This would ensure no potential bugs would occur with the apps necessary for travel.

For each entry in the AD file, the system uses its analysis to determine how long before or after the user should be protected against updates, or "blanketed". In this example, the user has a flight to catch. It would be terrible if there was a system update that somehow failed the night before flight when the user needs their phone to make the flight the next day. So, in this example, when the system determines that the user has a flight, it may set a blanket period of 6 hours before the flight during which no updates to certain systems software can be allowed. The time period set herein can be based on system defaults, and can be changed either by the user, or based on the user's practices.

In a similar way, the system can halt password resets to an app that the user is going to use. If the user is flying, then this response may also halt system updates, and password updates for all the apps that the user might be using to fly. If they are flying on United Airlines, this could halt the updates for United Airlines. Since they are flying, they might need to use a rideshare system, for all the rideshare apps, including Uber, could be halted during a period prior to the flight, again such as a 6-hour period, for example.

This is in recognition of the fact that having to update to update a password for you might use, right before you will need the app, can be disconcerting and stressful.

It is anticipated that the system could use its intelligence to warn the user of system updates. Case in point, if a software update was necessary on your Chase Bank app, it would alert you in advance of the pending disturbance to reduce anxiety.

In this embodiment, if there is a date when a password update is going to be required, this date can be stored as part of the AD file, and the user can be warned in advance that the password update will be necessary instead of it being a surprise.

In addition to the future activities of the user that are determined by analyzing the information as described above, there can also be current activities of the user, that are carried out by analyzing the user's current surroundings.

A scenario being monitored by the system is what the user is doing on their communicating device. In certain circumstances requiring a system or password update could be difficult such as when the user is traveling, the system can stop the updates, as in the scenarios described above.

However, if the user is carrying out purely social items, such as browsing on Amazon or scrolling through Instagram posts, the system might allow certain interruptions, such as notifications. On the other hand, if the user is traveling in car, bus, subway, or airplane, it might postpone the disturbance to increase user safety.

Another scenario is when the user is doing some kind of ongoing personal entertainment activity, such as listening to music, reading a book, or listening to a book. There can also be other entertainment scenarios, such as simply the user scrolling through shopping sites or Instagram, but the user having decided that they are going to take a break from work items to do this.

During that scenario, the system can also postpone disturbances for any kind of updates until the user finishes with that operation to avoid the update occurring while the user is in the middle of an entertainment activity.

However, if the user is taking a break from work, the AD file can also be updated to indicate that any notification from anything having to do with work should be either muted or held until after the period of break is over. So, if the user receives a text, the scanner can determine that the text is from someone associated with work, and hold the notification until after the user finishes their break. At the end of the break, the notification can be sent. However, the system temporarily holds the disturbance so that the user receives quiet time from anyone associated with work. However, the user may still receive notifications from things not having to do with work, such as Instagram notifications and other notifications having to do with their personal entertainment.

In an embodiment, this system can also query the user as to their preferred times. Are they a morning or evening person? What day of the week is preferred for device upkeep and maintenance? This questionnaire would help inform the device and can set preferred times for updates.

The user may be eating either at home or in a restaurant. Or, as above, the user can be on a break. During the time the user is on a break, they probably do not want to hear about Uber's special deals. However, the user may want to hear about some kinds of news updates or may want to hear about things that are posted by their favorite people on Instagram. The system therefore learns what the user might want to do at different times and in different scenarios.

User reactions can be monitored, to incorporate the user reactions into the preferences stored in the AD file and hence in the responses. The software operates to notice and remember the reaction of the user when prompted for an update or when disturbed by some notification. If an upgrade offer from United was pushed to the user's device and the user immediately swiped to eliminate it, that would be an indicator that they do not want to be bothered in that moment. The system then determines what is happening during that time when the user did not want to be bothered and determines what kind of thing the user did not want to be bothered with. If during the same kind of situation, the user gets a notification from Instagram, and immediately looks at it, then the system can learn that the user does want to be bothered with one kind of notification but does not want to be bothered with another kind of notification.

The system then stores in the AD file that the user should not be bothered for an upgrade offer from United while the user is in a restaurant. Similarly, the system can learn that the user does not want to be bothered for an upgrade offer while they are in a gym. From this, the system can generalize that the user might not want to be bothered for any upgrade offer from any app while they are carrying out any kind of leisure activity. However, the user might immediately look at an Instagram posts when notified of that post when in the gym, and therefore the system can determine that the user *does* want to be bothered for Instagram when they are in a restaurant or at a gym.

This can use even more granularity; where the communicating device determines by analyzing the user's current surroundings to determine if the user is alone or with other people by using the camera and/or microphone to determine if the user is talking to others. When the user is alone, they might be bothered in a different way than they are when they are with other people.

In this way, the system can write rules that indicate the user's location and activities and whether they should be bothered by those locations and activities.

An embodiment also creates responses using an automated operation. The camera 140 monitors the user of the communication device's facial expressions and the processor analyzes these facial expressions to determine if the user has scowled or otherwise made facial expression indicating that they were unhappy with the interruption. More generally, the camera 140 and microphone 145 are used to monitor the user's body language to attempt to verify whether the user has welcomed the interruption or is annoyed by it.

All of these can be used to determine rules. The rules indicate as much about what the user is doing as the system can intuit. This can be where was the user when the interruption occurred, who if anyone the user was with when it occurred, and what was the interruption. When a future similar interruption occurs, the system can handle it in the same way that the user handled it based on these rules.

The system can also monitor the sights and sounds of the user and the users' surroundings. If the smartphone microphone 145 hears PA Announcements, it can determine that the user is in a public place, and to wait on any disturbances.

If the system hears automobile noises or street noises on a sidewalk, it can also hold off any notifications.

If the microphone hears sounds from an TV set, or sounds from a movie screen, the system can determine that the user is watching TV or out a movie. This can be carried out by comparing the sounds to a database of TV sounds or movie sounds, in much the same way that shazam compares sounds to determine the specific music that is playing.

The system can monitor light levels and movement. A dark room without any device motion for two hours could likely indicate the user is sleeping.

All of these things can be set as either default rules or learned rules. For example, the system can set default rules for sleeping and for what to do in public places. The user can override those rules for example by telling their AI assistant "next time I get a notification from Instagram when I am in a public place you can still notify me". This can also be done, for example, for delayed notifications, if the notification is delayed based on the systems determination that the user might not want to do this, when the user finally does get the notification, they can say "next time notify me immediately" which changes the AD file and causes the system to operate differently the next time around.

All these activities would be organized by the program in such a way as to learn behaviors and patterns. Like a Nest or Google Home thermostat, the smartphone would adapt its notifications and disturbances to the user's lifestyle and preferences.

Thus, a goal of the invention is to increase user satisfaction, reduce stress, and enhance safety without sacrificing connectivity.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A personal communicating device, comprising:

a processor;

a memory, storing plural different programs and a preference file;

a communication function which enables communicating to and from other users and also receiving notifications and requests to update said programs;

the processor operating to:

send and receive messages to remote sources;

maintain a calendar with calendar entries for a user of the communicating device;

determining a location of the device;

store in the memory, for each of a number of activities of the user, a response that manages interruptions that the communicating device will cause to the user during that activity;

analyze the messages and the calendar entries to determine future activities of the user;

at a time of the future activities of the user, using the response stored in the memory to manage the interruptions that the communication device will cause to the user during that activity;

analyzing the user's current surroundings to determine a current activity of the user;

during the current activity of the user, using the response stored in the memory to manage the interruptions that the communication device will cause to the user during the current activity;

wherein the interruptions include both system interruptions for computer software updates to the communication device and computer software updates to applications on the communication device, where the stored response comprises stopping the computer software updates; and wherein the interruptions also include notifications sent to the communication device, and where the response indicates a first notification from a first computer app that can be sent to the communication device during the current activity, and a second notification from a second computer app that is blocked from being sent to the communication device during the current activity, wherein the system uses a camera on the communication device to analyze a body language when a notification is sent, and uses the user's body language to determine whether the notification is welcomed or unwelcomed, and updates the preference file based on the determination to prevent a future notification from being sent when the body language analysis indicates that the notification is unwelcomed, and to allow a future notification to be sent when the body language analysis indicates that the notification is welcomed.

2. The system as in claim 1, wherein the notifications that are blocked during the activity are sent after the activity is over.

3. The system as in claim 2, wherein the system determines that a user would prefer to receive the notifications that were blocked during the activity, and updates the preference file, and during subsequent activities sends the notifications that were blocked.

4. The system as in claim 1, wherein the current situation plan of the user is a travel operation, and the system is prevented from carrying out updates to apps that are used for a flight associated with the travel, transportation associated with the travel and hotels associated with the travel.

5. The system as in claim 1, wherein the current activity of the user is that the user is taking a break, and the system prevents notifications of communications from people during the breaks, and sends the notifications of the communications after the break is over.

6. The system as in claim 1, wherein the communicating device analyzes sounds to determine if the user is alone or with other people, and provides a first response of notifications to a user who is alone, and a second different response of different notifications to a user who is with other people.

7. The system as in claim 1, where the communicating device analyzes interruptions that are sent to the user, to determine where was the user when the interruption occurred, who if anyone the user was with when it occurred, and what was the interruption, determines, from a user body language, whether the user welcomes the interruption, and sets a rule of whether the interruption is welcomed or not welcomed, and when future interruptions occur, the system sends interruptions that have been indicated as welcomed, and not send interruptions that are indicated as unwelcome.

8. A method of controlling interruptions to a user, comprising:

storing a preferences file on a personal communicating device which indicates for each of a plurality of current activities of the user, a set of first notifications from apps that are running on the first communicating device that have been welcomed by the user during a specific activity and a set of second notifications from the apps that are running on the first communicating device that have not been welcomed by the user during the specific activity;

determining, by analyzing body language of the user, whether a notification is unwelcome, and updating the preferences file to indicate an activity and a nature of the notification that was unwelcome, to block similar notifications during similar activities in the future;

analyzing a user's current surroundings to determine a current activity of the user; reading from the preferences file, to find an activity listed in the preferences file which matches to the current activity of the user;

sending notifications from a first app running on the personal communicating device that are indicated in the preferences file to be welcomed during the current activity;

blocking notifications from the first app running on the personal communicating device that have been indicated as not being welcome during the current activity;

sending notifications from a second app running on the personal communicating device that are indicated in the preferences file to be welcomed during the current activity, where the notifications from the second app that are welcomed are different than the notifications from the first app that are welcomed;

blocking notifications from the second app running on the personal communicating device that have been indicated as not being welcomed during the current activity, where the notifications from the second app that have been indicated as not being welcomed are different from the notifications from the first app that have been indicated as not being welcomed, and using a camera on the communication device to analyze a body language when a notification is sent, and using the user's body language to determine whether the notification is welcomed or unwelcomed, and updates the preferences file based on the determination to prevent a future notification from being sent when the body language analysis indicates that the notification is unwelcomed, and to allow a future notification to be sent when the body language analysis indicates that the notification is welcomed.

9. The method as in claim 8, wherein the notifications from the first app and the notifications from the second app are sent after the end of the current activity.

10. The method as in claim 8, further comprising analyzing messages on the communicating device and analyzing a calendar on the communicating device to determine future activities of the user, and using the preferences during the future activities to determine to send a notification from an app and to block a notification from another app.

* * * * *